US012501321B2

(12) United States Patent
Chen

(10) Patent No.: US 12,501,321 B2
(45) Date of Patent: Dec. 16, 2025

(54) APPARATUS AND METHOD OF WIRELESS COMMUNICATION FOR MBS

(71) Applicant: PURPLEVINE INNOVATION COMPANY LIMITED, Hong Kong (HK)

(72) Inventor: Chiu-Wen Chen, Hong Kong (HK)

(73) Assignee: PURPLEVINE INNOVATION COMPANY LIMITED, Hong Kong (CN)

( * ) Notice: Subject to any disclaimer, the term of this patent is extended or adjusted under 35 U.S.C. 154(b) by 427 days.

(21) Appl. No.: 18/303,597

(22) Filed: Apr. 20, 2023

(65) Prior Publication Data

US 2023/0262532 A1 Aug. 17, 2023

Related U.S. Application Data

(63) Continuation of application No. PCT/CN2021/125029, filed on Oct. 20, 2021.
(Continued)

(51) Int. Cl.
*H04W 36/00* (2009.01)
*H04W 36/02* (2009.01)
(Continued)

(52) U.S. Cl.
CPC ..... *H04W 36/0007* (2018.08); *H04W 36/023* (2013.01); *H04W 36/26* (2013.01); *H04W 36/32* (2013.01)

(58) Field of Classification Search
CPC ........... H04W 36/0007; H04W 36/023; H04W 36/26; H04W 36/32; H04W 4/06; Y02D 30/70
See application file for complete search history.

(56) References Cited

U.S. PATENT DOCUMENTS

2014/0112236 A1 4/2014 Jung et al.
2014/0198645 A1* 7/2014 Worrall ............ H04W 28/0252
370/312
(Continued)

FOREIGN PATENT DOCUMENTS

CN 101674186 A 3/2010

OTHER PUBLICATIONS

International Search Report in International application No. PCT/CN2021/125029, mailed on Jan. 19, 2022.
(Continued)

*Primary Examiner* — Luat Phung
(74) *Attorney, Agent, or Firm* — PV IP PC; Wei Te Chung

(57) ABSTRACT

An apparatus and a method of wireless communication for multicast and broadcast service (MBS) are provided. The method for MBS by a user equipment (UE) includes transmitting a UE assistance information to a source cell and/or a target cell for cell reselection, receiving a group notification from the source cell and/or the target cell, wherein the group notification is transmitted based on a 5G multicast and broadcast service (5MBS) service continuity (SC) request and a 5MBS response between the source cell and the target cell, and receiving an MBS data transmission via a specific bearer type from the source cell and/or the target cell based on an MBS reliability requirement, wherein the MBS data transmission is transmitted via a multicast radio bearer (MRB) which is multiplexed with a unicast data.

20 Claims, 8 Drawing Sheets

Related U.S. Application Data

(60) Provisional application No. 63/093,842, filed on Oct. 20, 2020.

(51) Int. Cl.
    *H04W 36/26*     (2009.01)
    *H04W 36/32*     (2009.01)

(56) References Cited

U.S. PATENT DOCUMENTS

| | | | |
|---|---|---|---|
| 2014/0307617 A1* | 10/2014 | Laitila | H04W 28/02 370/312 |
| 2023/0027425 A1* | 1/2023 | Zhu | H04W 36/0007 |
| 2024/0179580 A1* | 5/2024 | Fujishiro | H04W 36/0007 |
| 2024/0187140 A1* | 6/2024 | Di Girolamo | H04L 1/1896 |
| 2025/0227558 A1* | 7/2025 | Zhu | H04W 36/0085 |

OTHER PUBLICATIONS

Written Opinion of the International Search Authority in International application No. PCT/CN2021/125029, mailed on Jan. 19, 2022.

3GPP. "Technical Specification Group Services and System Aspects: Study on architectural enhancements for 5G multicast-broadcast services (Release 17)" 3GPP TR.757 v0.5.0, Sep. 30, 2020.

Vivo. "KI#1, Sol#15: Update" SA WG2 Meeting #140E e-meeting, S2-2005264, Sep. 2, 2020.

\* cited by examiner

APPARATUS AND METHOD OF WIRELESS COMMUNICATION FOR MBS

CROSS REFERENCE TO RELATED APPLICATIONS

This application is the National Stage of PCT/CN2021/125029 filed on Oct. 20, 2021, which claims priority to U.S. provisional application No. 63/093,842, filed on Oct. 20, 2020. The present application claims priority and the benefit of the above-identified applications and the above-identified applications are incorporated by reference herein in their entireties.

BACKGROUND

Field

The present disclosure relates to the field of communication systems, and more particularly, to an apparatus and a method of wireless communication for multicast and broadcast service (MBS), which can provide a good communication performance and/or high reliability.

Background

No broadcast/multicast feature support is specified in the first two new radio (NR) releases, i.e., Rel-15 and Rel-16. Nevertheless, there are important use cases, such as public safety and mission critical, vehicle to everything (V2X) applications, transparent internet protocol version 4 (IPv4)/IPv6 multicast delivery, internet protocol television (IPTV), software delivery over wireless, group communications, and internet of things (IoT) applications, but not limited to, for which broadcast/multicast could provide substantial improvements, especially regards to system efficiency and user experience. In 5G NR multicast and broadcast service (i.e., Rel-17 or further release), single-cell point-to-multipoint (SC-PTM) defined in long term evolution (LTE) is the baseline.

The architecture of 5G NR multicast and broadcast service (5MBS) is expected to be similar to SC-PTM defined in LTE. Further, multicast-broadcast single-frequency network (MBSFN) described in LTE is not expected to be supported in 5MBS. In NR, it supports the reception of 5MBS transmission by mobile UEs in idle/inactive/connected states. It means that when the 5MBS transmission is delivered in a small area (e.g., single cell), handovers and tracking area updates may frequently occur between small areas because of small coverage area of SC-PTM. Service interruption of 5MBS is happened during performing UE handover and tracking area update. This results in a serious 5MBS data loss and un-reliable 5MBS transmission.

Therefore, there is a need for an apparatus and a method of wireless communication for multicast and broadcast service (MBS) of the same, which can solve issues in the prior art, provide a lower power consumption for 5MBS reception, provide a better resource efficiency for 5MBS networks, provide a higher reliability of 5MBS transmission, reduce a data loss during handover, provide a service continuity due to mobility, and/or provide a good communication performance.

SUMMARY

An object of the present disclosure is to propose an apparatus and a method of wireless communication for multicast and broadcast service (MBS) of the same, which can solve issues in the prior art, provide a lower power consumption for 5MBS reception, provide a better resource efficiency for 5MBS networks, provide a higher reliability of 5MBS transmission, reduce a data loss during handover, provide a service continuity due to mobility, and/or provide a good communication performance.

In a first aspect of the present disclosure, a method of wireless communication for multicast and broadcast service (MBS) by a user equipment (UE) comprises transmitting a UE assistance information to a source cell and/or a target cell for cell reselection, receiving a group notification from the source cell and/or the target cell, wherein the group notification is transmitted based on a 5G multicast and broadcast service (5 MBS) service continuity (SC) request and a 5MBS response between the source cell and the target cell, and receiving an MBS data transmission via a specific bearer type from the source cell and/or the target cell based on an MBS quality of service (QoS) requirement, wherein the MBS data transmission is transmitted via a multicast radio bearer (MRB) which is multiplexed with a unicast data.

In a second aspect of the present disclosure, a method of wireless communication for multicast and broadcast service (MBS) by a cell comprises receiving a user equipment (UE) assistance information for cell reselection from a UE, wherein the cell is a source cell or a target cell, transmitting a group notification to the UE, wherein the group notification is transmitted based on a 5G multicast and broadcast service (5MBS) service continuity (SC) request and a 5MBS response between the source cell and the target cell, and transmitting an MBS data transmission via a specific bearer type to the UE based on an MBS quality of service (QoS) requirement, wherein the MBS data transmission is transmitted via a multicast radio bearer (MRB) which is multiplexed with a unicast data.

In a third aspect of the present disclosure, a UE comprises a memory, a transceiver, and a processor coupled to the memory and the transceiver. The transceiver is configured to transmit a UE assistance information to a source cell and/or a target cell for cell reselection, the transceiver is configured to receive a group notification from the source cell and/or the target cell, wherein the group notification is transmitted based on a 5G multicast and broadcast service (5MBS) service continuity (SC) request and a 5MBS response between the source cell and the target cell, and the transceiver is configured to receive an MBS data transmission via a specific bearer type from the source cell and/or the target cell based on an MBS quality of service (QoS) requirement, wherein the MBS data transmission is transmitted via a multicast radio bearer (MRB) which is multiplexed with a unicast data.

In a fourth aspect of the present disclosure, a cell comprises a memory, a transceiver, and a processor coupled to the memory and the transceiver. The transceiver is configured to receive a user equipment (UE) assistance information for cell reselection from a UE, wherein the cell is a source cell or a target cell, the transceiver is configured to transmit a group notification to the UE, wherein the group notification is transmitted based on a 5G multicast and broadcast service (5 MBS) service continuity (SC) request and a 5MBS response between the source cell and the target cell, and the transceiver is configured to transmit an MBS data transmission via a specific bearer type to the UE based on an MBS quality of service (QoS) requirement, wherein the MBS data transmission is transmitted via a multicast radio bearer (MRB) which is multiplexed with a unicast data.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In this disclosure, the term "/" can be interpreted to indicate "and/or."

Figure 1A:
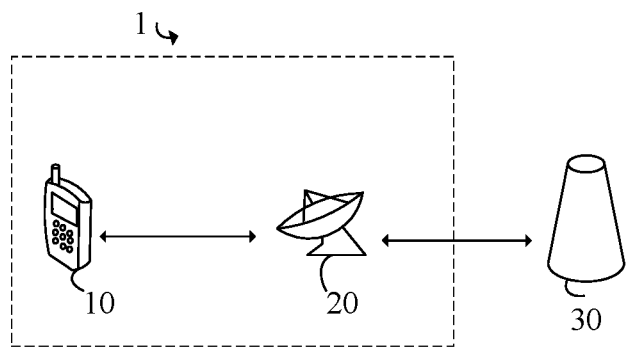
FIG. 1A is a schematic diagram illustrating a communication controlling system according to an embodiment of the present disclosure.
Figure 1B:
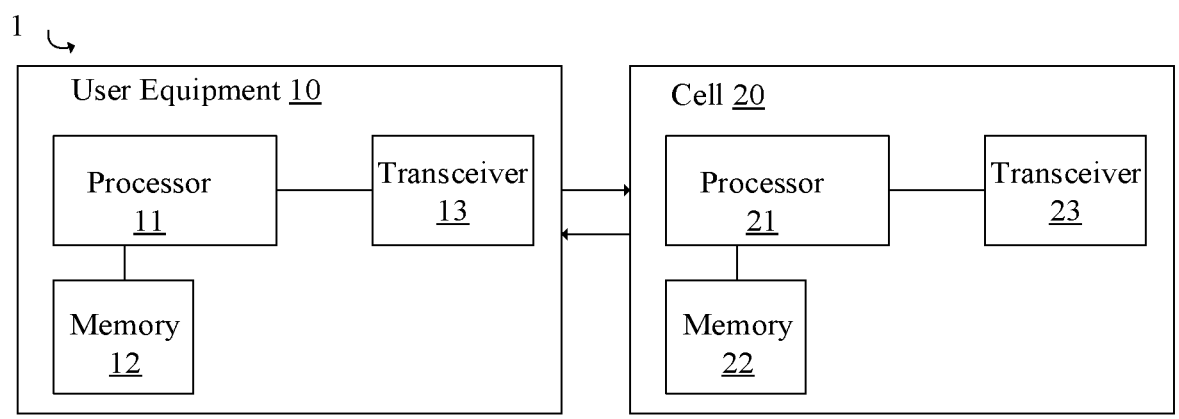
FIG. 1B is a block diagram illustrating a communication controlling system according to an embodiment of the present disclosure.

FIG. 1A and FIG. 1B illustrate that, in some embodiments, a communication controlling system 1 according to an embodiment of the present disclosure is provided. The communication controlling system 1 comprises a user equipment 10 and a cell 20. The cell 20 can be a source cell or a target cell. The cell 20 can be a base station. The base station can be a source base station or a target base station. The user equipment 10 and the cell 20 may communicate with each other either wirelessly or in a wired way. The cell 20 and a next generation core network 30 may also communicate with each other either wirelessly or in a wired way. When the communication controlling system 1 complies with a new radio (NR) standard of 3rd generation partnership project (3GPP), the next generation core network 30 is a backend serving network system and may comprise an access and mobility management function (AMF), a user plane function (UPF), and a session management function (SMF). The user equipment 10 may be a non-public network (NPN) capable apparatus or a non-NPN capable apparatus, but the present disclosure is not limited to this. The user equipment 10 comprises a processor 11, a memory 12, and a transceiver 13. The processor 11 is coupled to the memory 12 and the transceiver 13. The transceiver 13 of the user equipment 10 is configured to transmit a signal to the cell 20 so that the user equipment 10 communicates with the cell 20 each other. The cell 20 may include a processor 21, a memory 22, and a transceiver 23. The processor 21 is coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The transmission of 5G multicast and broadcast service (5MBS) is more flexible and reliable since some of 5MBS functionality is moved from 5G core network (5GCN) to radio access network (RAN). In order to achieve the reliability and service continuity for 5MBS transmission, some UE-assisted information can be taken into account.

Figure 2:
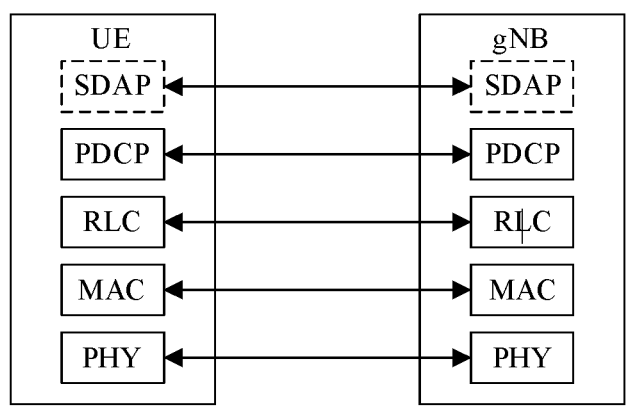
FIG. 2 is a schematic diagram illustrating a user plane radio protocol architecture within a gNB and a UE for 5G multicast and broadcast service (5 MBS) according to an embodiment of the present disclosure.
Figure 3:
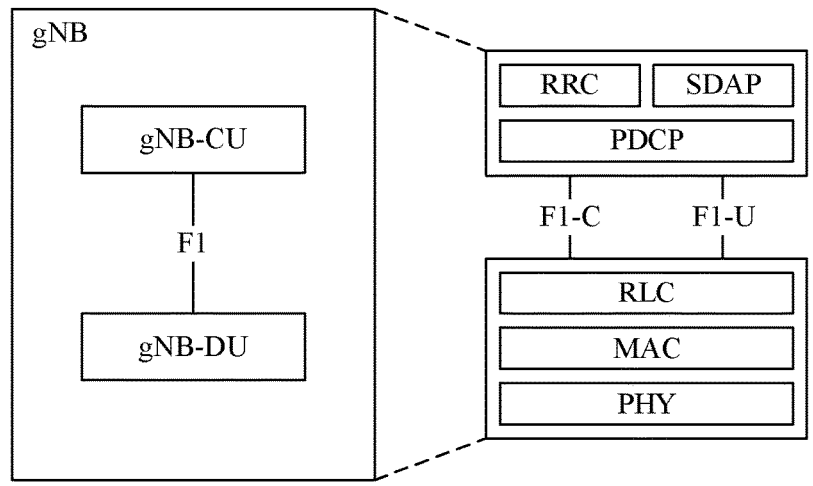
FIG. 3 is a schematic diagram illustrating that in a radio access network (RAN) functional split, a gNB further comprises a centralized unit (CU) and a plurality of distributed unit (DUs) according to an embodiment of the present disclosure.

In new radio (NR), point to multipoint transmission in a cell (i.e., single cell-point to multipoint, SC-PTM) is supported for 5G multicast and broadcast service (5 MBS) transmission. FIG. 2 illustrates a user plane radio protocol architecture within a gNB and a UE for 5G multicast and broadcast service (5 MBS) according to an embodiment of the present disclosure. FIG. 2 illustrates that, in some embodiments, the user plane radio protocol architecture within the gNB and the UE for 5MBS includes a service data adaptation protocol (SDAP), a packet data convergence protocol (PDCP), a radio link control (RLC), and a medium access control (MAC). In NR, if a 5MBS session can be mapped to multiple 5MBS QoS flows, there can be two options regarding the 5MBS QoS flows which are mapped to 5MBS radio bearers: 1) Reuse NR SDAP to handle the bearer mapping; 2) Depend on the implementation without NR SDAP stack. In an RAN functional split, a gNB further comprises a centralized unit (CU) and a plurality of distributed unit (DUs) as shown in FIG. 3. The protocol stack of the CU comprises an RRC layer, a SDAP layer, and a PDCP layer, while the protocol stack of DU comprises an RLC layer, a MAC layer, and a PHY layer. The F1 interface between the CU and the DU is established between the PDCP layer of the protocol stack and the RLC layer of the protocol stack. The gNB, providing 5MBS towards the UEs, can decide to transmit 5MBS flows via multicast radio bearer (e.g., MRB) and/or unicast data radio bearer (e.g., specific DRB) based on 5MBS QoS (e.g., reliability) requirement. The 5MBS using point-to-multipoint (PTM) transmissions is delivered by MRB for a given UE(s) as well as the PDCCH-scheduled PTM PDSCH data is scrambled by a specific Group-RNTI (G-RNTI). The 5MBS using point-to-point (PTP) transmissions is delivered by the specific DRB with the scrambled C-RNTI for a given UE(s) as well as the PDCCH-scheduled PTP PDSCH data is scrambled by a specific Cell-RNTI (C-RNTI).

In addition to hybrid automatic repeat request (HARQ)/automatic repeat-request (ARQ) mechanisms, 5MBS with carrier aggregation (CA) duplication and dual connectivity (DC) duplication can be used to improve reliability of multicast/broadcast data transmission and achieve service continuity during bearer switching and mobility. Supporting PDCP duplication with more than one active RLC entity for 5MBS, the reliability requirements in MAC/PHY layer can be relaxed and low data loss can be expected during handover (for connected UEs), even tracking area updates (for idle/inactive UEs). It would be beneficial to (but are not limited to) mission critical, public safety, V2X applications, software update via RAN, and some other group communications in IoT applications.

Figure 4:
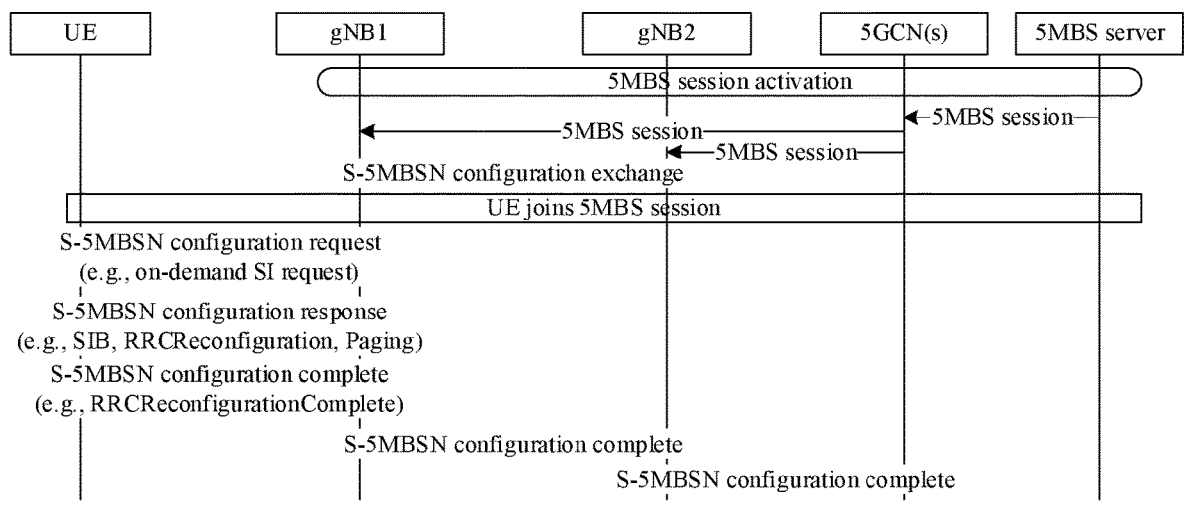
FIG. 4 is a schematic diagram illustrating a shared-5MBS network (S-5MBSN) configuration procedure according to an embodiment of the present disclosure.

A shared-5MBS network (S-5MBSN) is a network shared by inter-cell/inter-node/multiple PLMNs that provides the same multicast or broadcast session/content. The shared 5MBS packet is scheduled by the gNBs independently based on the different 5MBS data arrive time from 5G core network(s) (5GCN). As a result of 5MBS independently scheduling by gNB, all 5MBS traffic mapped to PDSCH can be dynamically scheduled with unicast traffic. The S-5MBSN can be a public network, an integrated private network, or a standalone private network. At least the 5MBS bearer context in the S-5MBSN is shared. The 5MBS bearer context includes all information describing the particular 5BMS bearer information and is stored in each gNB involved in the same S-5MBSN. FIG. 4 shows an example of S-5MBSN configuration procedure. After 5MBS session is activated, the following S-5MBSN configuration information (but not limited to) is exchanged between inter-cell/inter-node/multiple PLMNs when the S-5MBSN configuration procedure is performed.

The following S-5MBSN configuration information may include S-5MBSN identifier (e.g., the identifier associated with service area ID (SAT)), 5MBS identifier (e.g., MBS Session ID, TMGI, etc.), G-RNTI, bearer type (e.g., PTM bearer (MRB) or PTP bearer (specific DRB) for 5MBS), transmission/interested frequency and period, start sequence number, end sequence number, 5MBS service continuity bit, UE context information, UE capability (e.g., UE supported/interested frequency), Group UE identifier, UE's mobility restriction for 5G private network, CAG ID for 5G private network, and/or some UE-specific information (e.g., DRX configuration) which can be exchanged if necessary.

The exchanged S-5MBSN configuration procedure (it may include request and response messages) between inter-cell/inter-node/multiple PLMNs can be performed in any time during the activation of 5MBS session when necessary. Furthermore, some of the S-5MBSN configuration information can be forwarded to UE(s) via broadcast or unicast with at least one RRC signaling (e.g., SIB, paging, RRCReconfiguration, etc.). In some cases, the associated S-5MBSN configuration information can be transmitted in multiple system information blocks (e.g., SIB s). For example, but not limited to, some of associated S-5MBSN information (e.g., S-5MBSN identifier, 5MBS identifier, associated transmission frequency, etc.) is provided in one SIB whereas some other associated S-5MBSN information (DRX configuration, 5MBS service continuity bit, etc.) is provided in the other SIB(s). Within broadcast manner, those nodes (e.g., serving gNB/target gNB/MN/SN) who provide the 5MBS transmission may broadcast the associated S-5MBSN configuration information/change notification in system information (e.g., gNB1 transmits SIB2, or new SIB as shown in FIG. 4, but not limit to), 5G multicast control channel (5MCCH), and/or paging. In some embodiments, there is an association between S-5MBSN identifier/5MBS identifier and transmission frequency/period/resource. For example, but not limited to, the S-5MBSN identifier is mapped to an associated/pre-configured transmission frequency. The mapping between S-5MBSN identifier and the associated/pre-configured transmission frequency (e.g., BWP, carrier component, etc.) is provided in the broadcast signaling (e.g., SIB). In some cases, only S-5MBSN identifier/5MBS identifier is broadcasted in the broadcast signaling to imply the pre-configured transmission frequency/period/resource. Within unicast manner, the serving gNB may transmit the associated S-5MBSN configuration information in on-demand system information response (e.g., new SIB), RRC message (e.g., RRCReconfiguration, paging). The on-demand system information (SI) request is a specific preamble required by a UE who is interested to receive the associated 5MBS as shown in FIG. 4. Then the on-demand system information response (e.g., SIB as shown in FIG. 4) carrying the associated S-5MBSN configuration information is delivered via unicast or broadcast depends on the number of interested UE(s). The transmitted RRC message (e.g., RRCReconfiguration as shown in FIG. 4) carrying the associated S-5MBSN configuration information is delivered after the UE joins the 5MBS session. The UE is allowed to prioritize the interested 5MBS frequency upon the reception of SIB carrying the MCCH configuration from the reselected cell. If the reselected cell does not provide MCCH configuration, the UE may apply the stored valid MCCH configuration of the serving cell or may request the on-demand SIB for 5MBS.

FIG. 4 illustrates that, in some embodiments, the RRCReconfigurationComplete carrying the associated S-5MBSN configuration complete is transmitted when RRCReconfiguration is used. The S-5MBSN configuration complete is transmitted between S-5MBSN and 5GCN(s) when the S-5MBSN configuration information forwards to UE(s). In the S-5MBSN configuration procedure, the UE can be an idle/inactive/connected state UE, a gNB1 can be a serving gNB, master node (MN), and a gNB2 can be a target gNB or a secondary node (SN). The S-5MBSN configuration procedure is used before/when performing 5MBS handover, 5MBS tracking area update, 5MBS DC, and/or 5MBS bearer switching with service continuity.

Some 5MBS service continuity (SC) mechanisms are defined in some embodiments of this disclosure. It includes the transmission of 5MBS service continuity indication/bit/request/response/timer.

In some embodiments, a 5MBS service continuity (SC) indication is used to indicate the interested/duplicate 5MBS transmission of the target gNB or the SN without packet loss. It can be also used as an assistance information for gNB to activate 5MBS transmission during cell reselection. In some cases, it can be used for the PDCP duplication activation when the SN leg is deactivated. The indication is transmitted from the idle/inactive/connected UE to the serving/target gNB or the MN/SN. It can piggyback with an on-demand SI request via a specific preamble, an NR counting message, 5MBS InterestIndication, RRCReconfigurationComplete, RRCSetupComplete, ProximityIndication, a handover request from the UE, a tracking area update message, etc. The 5MBS SC indication may be one bit for SC reception. On the other hand, the 5MBS SC indication may include some information (e.g., the interested 5MBS frequency, the priority of reception frequency, the received end of 5MBS sequence number, the preferred bearer type, the preferred target gNB, etc.) to indicate the gNB(s) for 5MBS service continuity. Note that, the NR counting message or 5MBS InterestIndication is used to notify the gNB to count the number of UEs that are interested in the reception of the 5MBS content(s). The UE in the idle/inactive/connected state can transmit the NR counting message or 5MBS InterestIndication via CCCH/MCCH. Upon the reception of the NR counting, the gNB may restart a 5MBS SC timer for sustaining 5MBS content transmission.

In some embodiments, a 5MBS service continuity (SC) request is used to require the corresponding information for the continuing/duplicate 5MBS transmission. The request is transmitted from the serving gNB/MN to the target gNB/SN. In some cases, the request is transmitted from the target gNB/SN to the serving gNB/MN for requiring the associated 5MBS configuration information. The transmitted request information may include some of the proposed S-5MBSN configuration information (e.g., S-5MBSN identifier, 5MBS identifier, G-RNTI, bearer type, transmission frequency and period, start/end sequence number, 5MBS service continuity bit, UE context information, UE supported/interested frequency, group UE identifier, UE's mobility restriction, DRX configuration, etc.) when the S-5MBSN configuration procedure is not performed. On the other hand, the transmitted information may include the 5MBS service continuity bit and the end sequence number to activate the continuing/duplicate 5MBS transmission when the S-5MBSN configuration procedure is performed. The request is from the serving gNB/target gNB/MN/SN to the target gNB/serving gNB/SN/MN respectively.

In some embodiments, upon the reception of the 5MBS service continuity request, the 5MBS service continuity (SC) response is used to reply to the corresponding information for the continuing/duplicate 5MBS transmission. The response is transmitted from the target gNB/SN to the serving gNB/MN. In some cases, the response is transmitted from the serving gNB/MN to the target gNB/SN for replying the associated 5MBS configuration information. The transmitted response information may include some of the proposed S-5MBSN configuration information (e.g., S-5MBSN identifier, 5MBS identifier, G-RNTI, bearer type, transmission frequency and period, start/end sequence number, 5MBS service continuity bit, UE context information, UE supported/interested frequency, group UE identifier, UE's mobility restriction, DRX configuration, etc.) and/or some other reject/modify information (e.g., suggested bearer type from request) when the S-5MBSN configuration procedure is not performed. On the other hand, the transmitted information may include the confirmation of 5MBS service continuity bit and/or some other reject information when the S-5MBSN configuration procedure is performed. The response is from the target gNB/serving gNB/SN/MN to the serving gNB/target gNB/MN/SN respectively.

In some embodiments, a 5MBS service continuity (SC) bit is one bit carrying in the inter-node message (e.g., 5MBS SC request, 5MBS SC response, HandoverCommand, HandoverPreparationInformation, CG-Config, CG-ConfigInfo, UERadioPagingInformation, UERadioAccessCapabilityInformation, exchanged S-5MBSN configuration message, etc.). It is used to inform/activate the continuing/duplicate 5MBS transmission.

In some embodiments, a 5MBS service continuity (SC) timer is a timer for gNB(s). The target gNB/candidate gNBs/SN may start the 5MBS SC timer after the reception of a 5MBS SC request from the source gNB/serving gNB/MN and stop the transmission of 5MBS content when the timer is expired. It means that if all of the UEs do not enter in the coverage of the target gNB/candidate gNBs/SN and/or there is no other UE(s) interests in the 5MBS content in the target gNB/candidate gNBs/SN, the target gNB/candidate gNBs/SN should stop the transmission of 5MBS content after the timer is expired. Upon the reception of the 5MBS SC indication from the UE, the gNB may stop/restart the 5MBS SC timer for sustaining 5MBS content transmission.

Figure 5A:
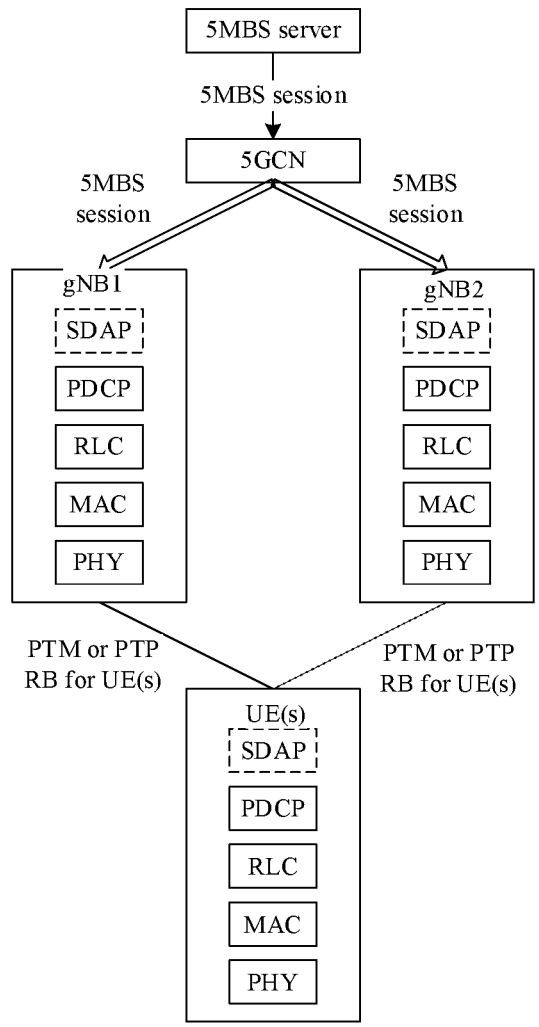
FIG. 5A is a schematic diagram illustrating an architecture of 5MBS service continuity according to an embodiment of the present disclosure.
Figure 5B:
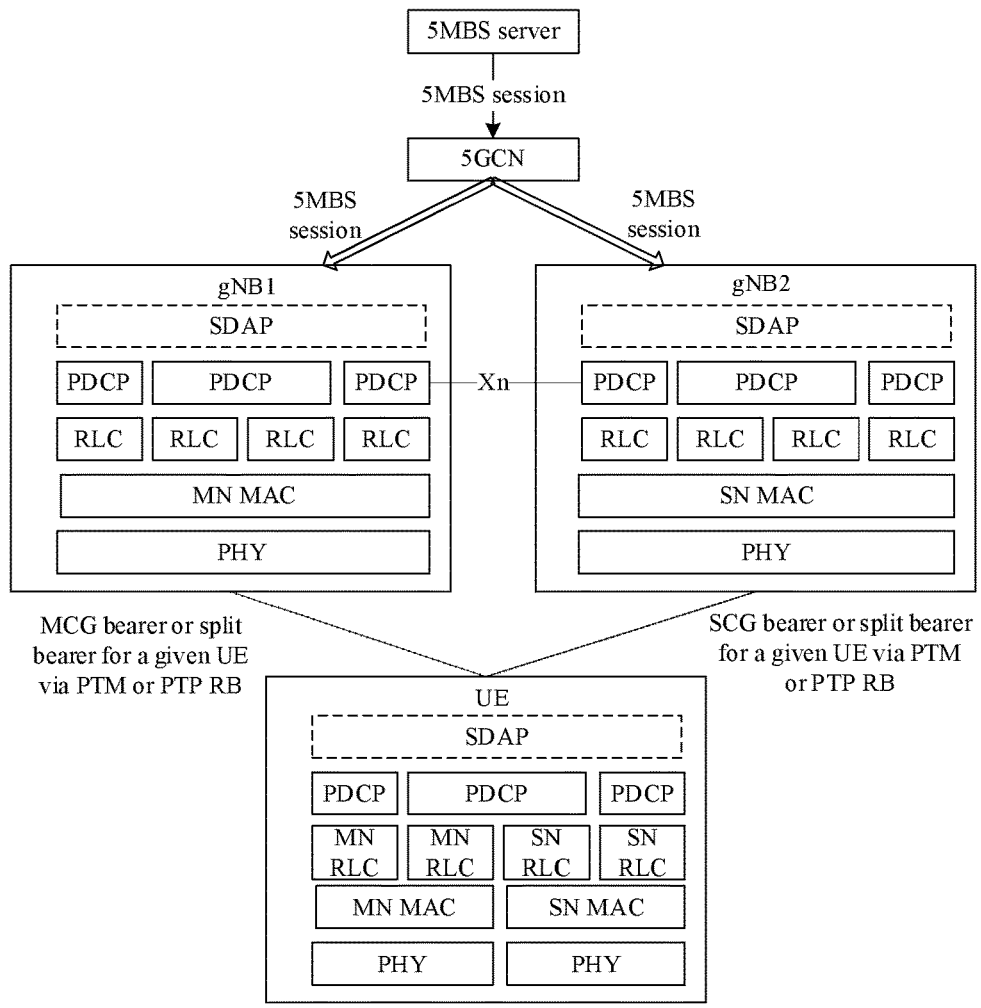
FIG. 5B is a schematic diagram illustrating an architecture of 5MBS service continuity according to an embodiment of the present disclosure.

FIG. 5A and FIG. 5B illustrate an architecture of 5MBS service continuity according to an embodiment of the present disclosure. The scenario would be gNBs in the same S-5MBSN using the same 5MBS session for 5MBS handover/tracking area update/dual connectivity/inter-cell bearer switching. When a dual connectivity for a given UE(s) is established, the inter-cell bearer switching means 5MBS transmission between PTM and PTP with service continuity (i.e., bearer switching within more than one cell/node) for a given UE(s). In FIG. 5A, it is applicable to use cases of UE(s) handover and UE(s) tracking area update. A gNB1 can be a source gNB/serving gNB, and a gNB2 can be a target gNB/candidate gNB. 5MBS handover/tracking area update may performer by a group of UE(s) via PTP or PTM radio bearer. In FIG. 5B, it is applicable to use cases of inter-cell bearer switching/(de)activation within dual connectivity. The gNB1 and the gNB2 can be MN and SN respectively. Based on the above S-5MBSN configuration and service continuity notification, reliability and service continuity can be supported for 5MBS transmission.

A shared-5MBS network (S-5MBSN) is proposed in some embodiments of this disclosure. For service continuity, a S-5MBSN configuration procedure is initiated before/when performing 5MBS handover, 5MBS tracking area update, 5MBS DC, and/or 5MBS bearer switching. Further, some service continuity (SC) mechanisms are proposed in some embodiments of this disclosure. In addition to HARQ/ARQ mechanisms, 5MBS with CA duplication and DC duplication can be used to improve reliability of 5MBS data transmission and achieve service continuity during bearer switching and mobility.

The main advantages of the disclosed exemplary methods include lower power consumption for 5MBS reception, better resource efficiency for 5MBS networks, a higher reliability of 5MBS transmission, reliability requirements in MAC/PHY layer which can be relaxed in PDCP duplication, lower data loss which can be expected during handover (for connected UEs), even tracking area update (for idle/inactive UEs), and/or service continuity due to mobility.

In some embodiments, the transceiver 13 is configured to transmit a UE assistance information to a source cell and/or a target cell for cell reselection, the transceiver 13 is configured to receive a group notification from the source cell and/or the target cell, wherein the group notification is transmitted based on a 5G multicast and broadcast service (5MBS) service continuity (SC) request and a 5MBS response between the source cell and the target cell, and the transceiver is configured to receive an MBS data transmission via a specific bearer type from the source cell and/or the target cell based on an MBS quality of service (QoS) requirement, wherein the MBS data transmission is transmitted via a multicast radio bearer (MRB) which is multiplexed with a unicast data. This can solve issues in the prior art, provide a lower power consumption for 5MBS reception, provide a better resource efficiency for 5MBS networks, provide a higher reliability of 5MBS transmission, reduce a data loss during handover, provide a service continuity due to mobility, and/or provide a good communication performance.

In some embodiments, the transceiver 23 is configured to receive a user equipment (UE) assistance information for cell reselection from a UE 10, wherein the cell 20 is a source cell or a target cell, the transceiver 23 is configured to transmit a group notification to the UE 10, wherein the group notification is transmitted based on a 5G multicast and broadcast service (5MBS) service continuity (SC) request and a 5MBS response between the source cell and the target cell, and the transceiver is configured to transmit an MBS data transmission via a specific bearer type to the UE based on an MBS quality of service (QoS) requirement, wherein the MBS data transmission is transmitted via a multicast radio bearer (MRB) which is multiplexed with a unicast data. This can solve issues in the prior art, provide a lower power consumption for 5MBS reception, provide a better resource efficiency for 5MBS networks, provide a higher reliability of 5MBS transmission, reduce a data loss during handover, provide a service continuity due to mobility, and/or provide a good communication performance.

Figure 6:
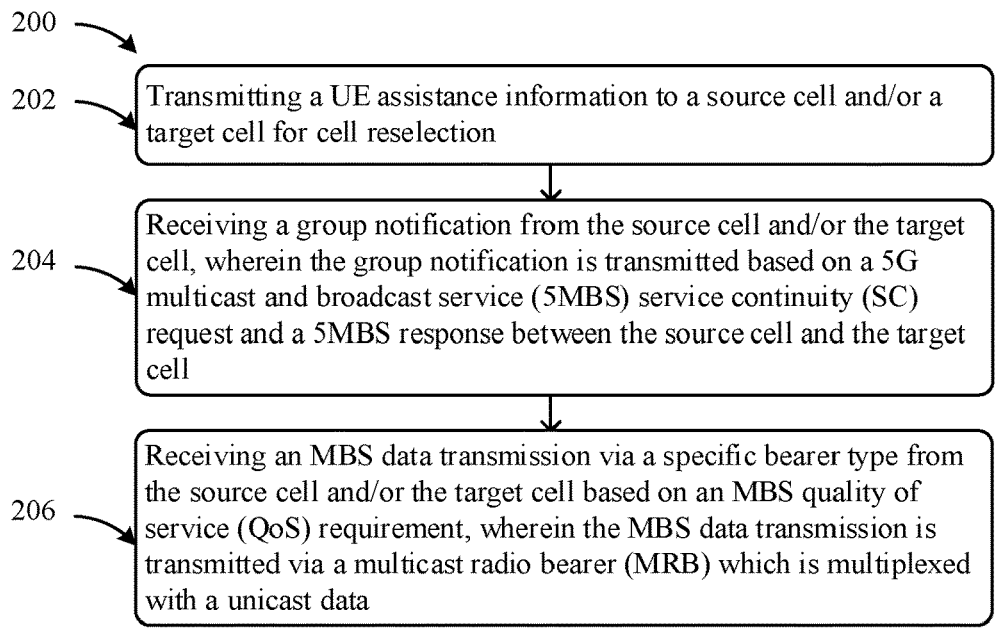
FIG. 6 is a flowchart illustrating a method of wireless communication for multicast and broadcast service (MBS) performed by a UE according to an embodiment of the present disclosure.

FIG. 6 illustrates a method 200 of wireless communication for multicast and broadcast service (MBS) performed by a UE according to an embodiment of the present disclosure. In some embodiments, the method 200 includes: a block 202, transmitting a UE assistance information to a source cell and/or a target cell for cell reselection, a block 204, receiving a group notification from the source cell and/or the target cell, wherein the group notification is transmitted based on a 5G multicast and broadcast service (5MBS) service continuity (SC) request and a 5MBS response between the source cell and the target cell, and a block 206, receiving an MBS data transmission via a specific bearer type from the source cell and/or the target cell based on an MBS quality of service (QoS) requirement, wherein the MBS data transmission is transmitted via a multicast radio bearer (MRB) which is multiplexed with a unicast data. This can solve issues in the prior art, provide a lower power consumption for 5MBS reception, provide a better resource efficiency for 5MBS networks, provide a higher reliability of 5MBS transmission, reduce a data loss during handover, provide a service continuity due to mobility, and/or provide a good communication performance.

Figure 7:
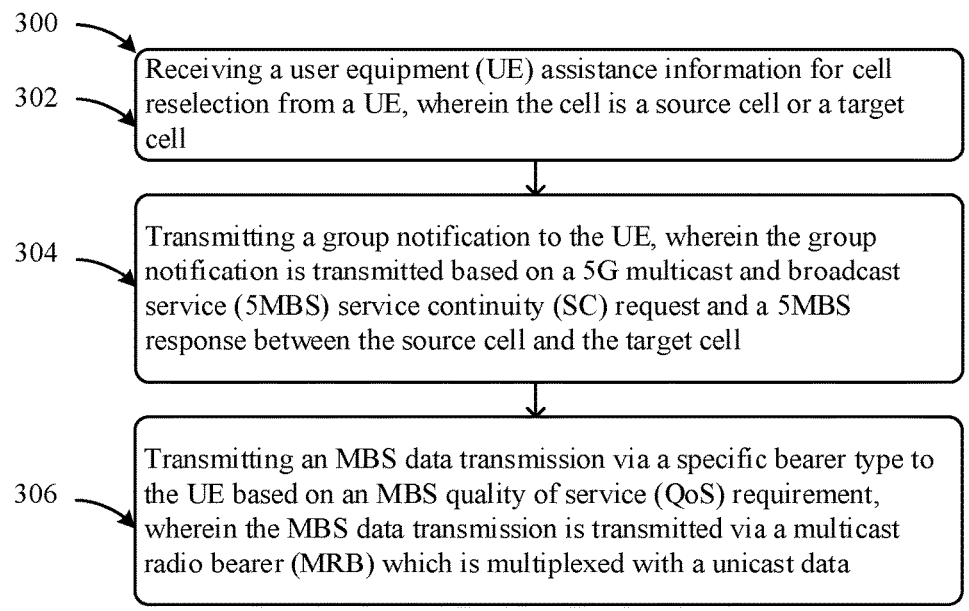
FIG. 7 is a flowchart illustrating a method of wireless communication for multicast and broadcast service (MBS) performed by a cell according to an embodiment of the present disclosure.

FIG. 7 illustrates a method 300 of wireless communication for multicast and broadcast service (MBS) performed by a cell according to an embodiment of the present disclosure. In some embodiments, the method 300 includes: a block 302, receiving a user equipment (UE) assistance information for cell reselection from a UE, wherein the cell is a source cell or a target cell, a block 304, transmitting a group notification to the UE, wherein the group notification is transmitted based on a 5G multicast and broadcast service (5MBS) service continuity (SC) request and a 5MBS response between the source cell and the target cell, and a block 306, transmitting an MBS data transmission via a specific bearer type to the UE based on an MBS quality of service (QoS) requirement, wherein the MBS data transmission is transmitted via a multicast radio bearer (MRB) which is multiplexed with a unicast data. This can solve issues in the prior art, provide a lower power consumption for 5MBS reception, provide a better resource efficiency for 5MBS networks, provide a higher reliability of 5MBS transmission, reduce a data loss during handover, provide a service continuity due to mobility, and/or provide a good communication performance.

Figure 8:
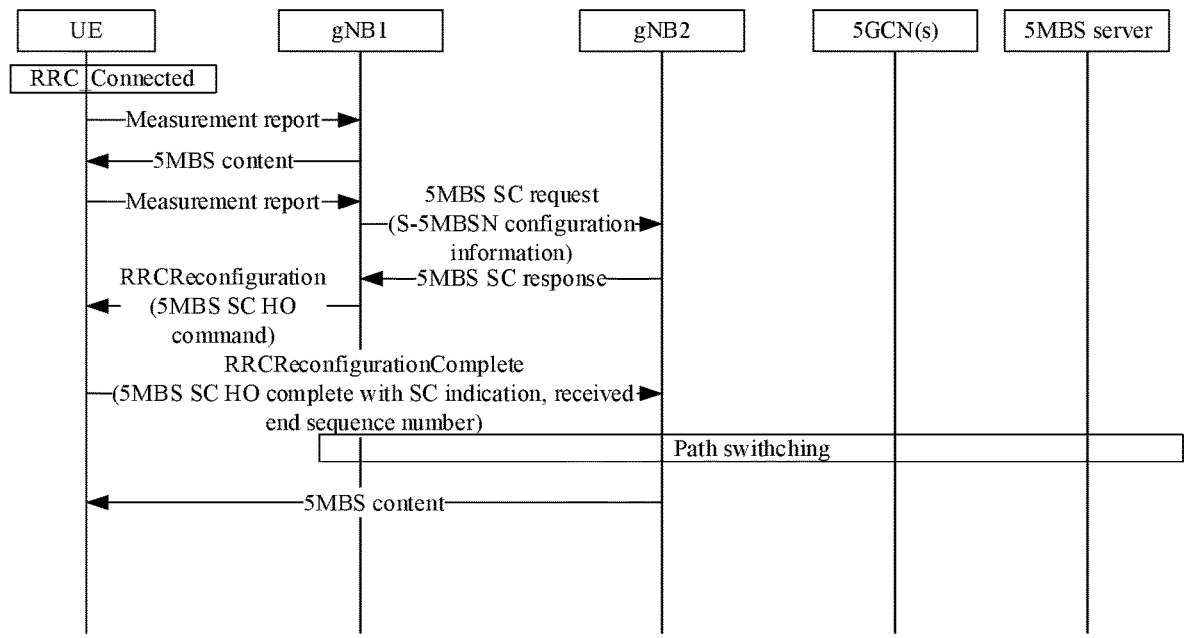
FIG. 8 is a schematic diagram illustrating an architecture of 5MBS service continuity according to an embodiment of the present disclosure.

FIG. 8 illustrates an architecture of 5MBS service continuity according to an embodiment of the present disclosure. FIG. 8 illustrates that, in some embodiments, the UE is an RRC_Connected UE, the gNB1 is a source gNB, and the gNB2 is a target gNB for 5MBS SC UE handover. Upon the reception of measurement report from UE, when the 5MBS SC UE handover condition is met (e.g., UE closes to the cell boundary of gNB1/the boundary of S-5MBSN, here we take that UE closes the cell boundary of gNB1 as an example), the gNB1 transmits the 5MBS SC request with the S-5MBSN configuration information. Based on the information of neighboring cell(s) for the UE/the same 5MBS session provided by the partner(s) (e.g., gNB2), the S-5MBSN configuration information is exchanged between the gNB1 and the gNB2. The exchanged S-5MBSN configuration information may include (but not limit to) S-5MBSN identifier, 5MBS identifier (e.g., MBS Session ID, TMGI, etc.), G-RNTI, source transmitted frequency and period, started 5MBS sequence number, UE context information, UE supported/interest frequency, UE's mobility restriction, CAG ID, etc. If the gNB2 accepts to join the S-5MBSN, it would start to buffer the 5MBS content for achieving 5MBS QoS (e.g., reliability) requirement and service continuity. Furthermore, if this embodiment is applicable to 5G private networks, the 5MBS SC UE handover condition should take the UE's mobility restriction into account. The gNB2 may buffer at least the end of 5MBS sequence number of 5MBS content and start to broadcast the 5MBS content for the UE. The gNB2 may start a 5MBS SC timer after the reception of 5MBS SC request from gNB1 and stop the transmission of 5MBS content when the timer is expired. It means that if the UE does not enter in the coverage of gNB2 and/or there is no other UE(s) interests the 5MBS content in gNB2, the gNB2 should stop the transmission of 5MBS content after the timer is expired. Then the gNB2 responds the 5MBS SC response with the related accepted 5MBS SC handover information (e.g., target transmitted frequency and period). The gNB1 transmits the 5MBS SC handover (HO) command (e.g., with the S-5MBSN configuration information and the target transmitted frequency and period) to the UE for SC configuration. The 5MBS SC HO command may transmit by RRCReconfiguration to inform the UE for performing 5MBS SC UE handover. The UE may transmit the 5MBS SC HO complete (e.g., RRCReconfigurationComplete) with SC indication/the end of received 5MBS sequence number to the gNB1/gNB2 (FIG. 8 only shows the message is sent to gNB2). When the UE detects that the UE is leaving or entering the boundary of source or target gNB by some of S-5MBSN information (e.g., S-5MBSN identifier, 5MBS identifier, G-RNTI) belonging to the stored S-5MBSN, the UE can transmit the 5MBS SC HO complete for service continuity. Then the UE path switching is performed by S-5MBSN and 5MBS system. The 5MBS content is transmitted continuously during the 5MBS SC UE handover. In some cases, if the 5MBS SC HO complete (e.g., RRCReconfigurationComplete) with SC indication/the end of received 5MBS sequence number is transmitted to the gNB1. Then the UE path switching is performed by S-5MBSN and 5MBS system. When the UE detects the boundary of target gNB based on some of received S-5MBSN information (e.g., S-5MBSN identifier, 5MBS identifier, G-RNTI) belonging to the stored S-5MBSN, the UE can transmit the 5MBS SC indication/received end of 5MBS sequence number (e.g., in NR counting, 5MBS InterestIndication, or the other UL feedback) to the gNB2 for 5MBS SC HO. The 5MBS content is transmitted continuously during the 5MBS SC HO. Upon the reception of the 5MBS SC indication from the UE, the gNB2 may stop/restart the 5MBS SC timer for sustaining 5MBS content transmission. In this embodiment, the gNB1 and gNB2 may unicast or broadcast the 5MBS content for the UE. The transmitted 5MBS SC HO command and 5MBS SC HO complete is unicast signaling.

Figure 9:
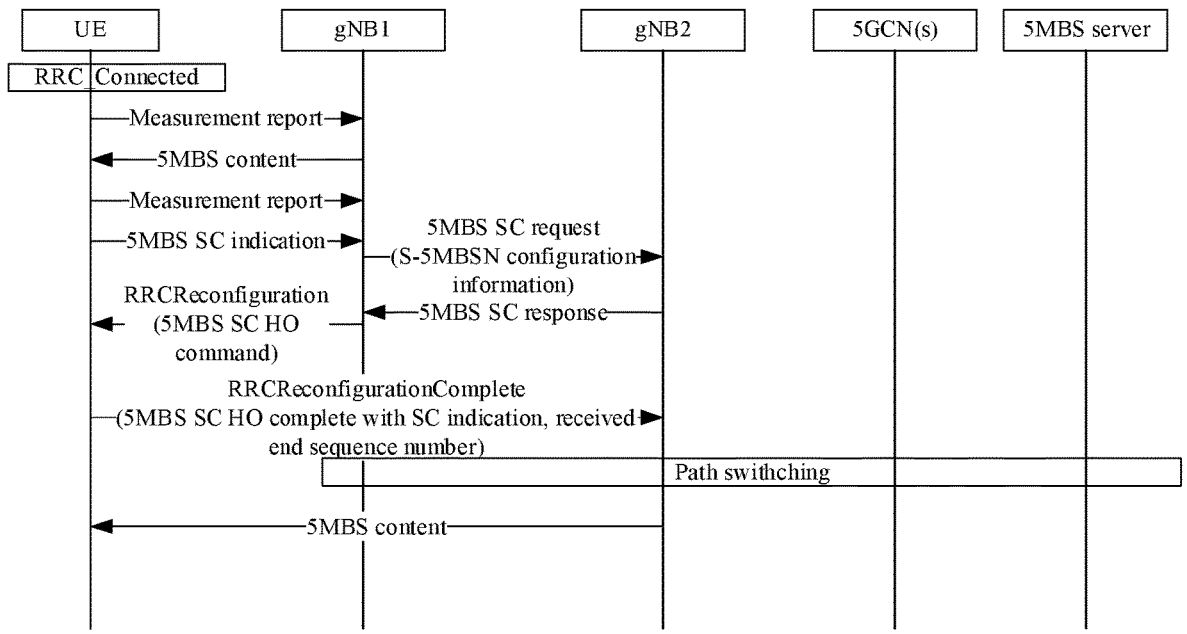
FIG. 9 is a schematic diagram illustrating an architecture of 5MBS service continuity according to an embodiment of the present disclosure.

FIG. 9 illustrates an architecture of 5MBS service continuity according to an embodiment of the present disclosure. FIG. 9 illustrates that, in some embodiments, the UE is an RRC_Connected UE, the gNB1 is a source gNB, and the gNB2 is a target gNB for 5MBS SC UE handover. Upon the reception of measurement report from UE, when the 5MBS SC UE handover condition is met (e.g., UE closes to the cell boundary of gNB1/the boundary of S-5MBSN, here we take that the UE closes the cell boundary of gNB1 as an example), the UE transmits the 5MBS SC indication to the gNB1 for initiating 5MBS SC UE handover. Furthermore, if this embodiment is applicable to 5G private networks, setting S-5MBSN and the 5MBS SC UE handover condition should take the UE's mobility restriction into account. The gNB1 transmits the 5MBS SC request with the S-5MBSN configuration information. Based on the information of neighboring cell(s) for the UE/the same 5MBS session provided by the partner(s) (e.g., gNB2), the S-5MBSN configuration information is exchanged between the gNB1 and the gNB2. The exchanged S-5MBSN configuration information may include (but not limit to) S-5MBSN identifier, 5MBS identifier (e.g., MBS Session ID, TMGI, etc.), G-RNTI, source transmitted frequency and period, started 5MBS sequence number, UE context information, UE supported/interest frequency, UE's mobility restriction, CAG ID, etc. If the gNB2 accepts to join the S-5MBSN, it would start to buffer the 5MBS content for achieving 5MBS QoS (e.g., reliability) requirement and service continuity. The gNB2 may buffer at least the end of 5MBS sequence number of 5MBS content and start to broadcast the 5MBS content for the UE. The gNB2 may start a 5MBS SC timer after the reception of 5MBS SC request from gNB1 and stop the transmission of 5MBS content when the timer is expired. It means that if the UE does not enter in the coverage of gNB2 and/or there is no other UE(s) interests the 5MBS content in gNB2, the gNB2 should stop the transmission of 5MBS content after the timer expired. Then the gNB2 responds the 5MBS SC response with the related accepted 5MBS SC handover information (e.g., target transmitted frequency and period). The gNB1 transmits the 5MBS SC handover (HO) command (e.g., with the S-5MBSN configuration information and the target transmitted frequency and period) to the UE for SC configuration. The 5MBS SC HO command may transmit by RRCReconfiguration to inform the UE for performing 5MBS SC UE handover. The UE may transmit the 5MBS SC HO complete (e.g., RRCReconfigurationComplete) with SC indication/the end of received 5MBS sequence number to the gNB1/gNB2 (FIG. 9 only shows the message is sent to gNB2). When the UE detects that the UE is leaving or entering the boundary of source or target gNB by some of S-5MBSN information (e.g., S-5MBSN identifier, 5MBS identifier, G-RNTI) belonging to the stored S-5MBSN, the UE can transmit the 5MBS SC HO complete for service continuity. Then the UE path switching is performed by S-5MBSN and 5MBS system. The 5MBS content is transmitted continuously during the 5MBS SC UE handover. In some cases, if the 5MBS SC HO complete (e.g., RRCReconfigurationComplete) with SC indication/the end of received 5MBS sequence number is transmitted to the gNB1. Then the UE path switching is performed by S-5MBSN and 5MBS system. When the UE detects the boundary of target gNB based on some of received S-5MBSN information (e.g., S-5MBSN identifier, 5MBS identifier, G-RNTI) belonging to the stored S-5MBSN, the UE can transmit the 5MBS SC indication/received end of 5MBS sequence number (e.g., in NR counting, 5MBS InterestIndication, or the other UL feedback) to the gNB2 for 5MBS SC HO. The 5MBS content is transmitted continuously during the 5MBS SC HO. Upon the reception of the 5MBS SC indication from the UE, the gNB2 may stop/restart the 5MBS SC timer for sustaining 5MBS content transmission. In this embodiment, the gNB1 and gNB2 may unicast or broadcast the 5MBS content for the UE. The transmitted 5MBS SC indication and 5MBS SC HO complete is unicast to the gNBs separately. The 5MBS HO command is unicast signaled to the UE.

Figure 10:
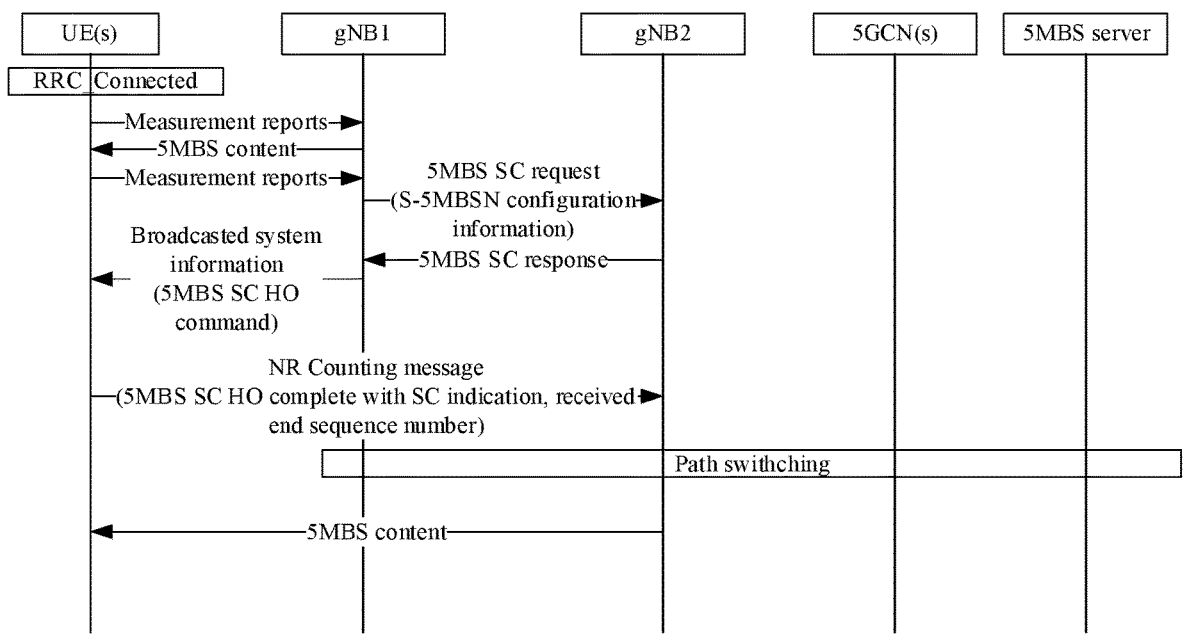
FIG. 10 is a schematic diagram illustrating an architecture of 5MBS service continuity according to an embodiment of the present disclosure.

FIG. 10 illustrates an architecture of 5MBS service continuity according to an embodiment of the present disclosure. FIG. 10 illustrates that, in some embodiments, the UEs (i.e., at least one UE) are a group of RRC_Connected UEs, the gNB1 is a source gNB, and the gNB2 is a target gNB for 5MBS SC group handover. During 5MBS UEs handover, the same 5MBS content required by a group of UEs may be pre-configured with a group UE identifier. Upon the reception of measurement reports from UEs, when the 5MBS UEs handover condition is met (e.g., some UEs close to the cell boundary of gNB1/S-5MBSN), the gNB1 transmits the 5MBS SC request with the S-5MBSN configuration information. Furthermore, if this embodiment is applicable to 5G private networks, the 5MBS SC UE handover condition should take the UEs' mobility restriction into account. Based on the information of neighboring cell(s) for the UE/the same 5MBS session provided by the partner(s) (e.g., gNB2), the S-5MBSN configuration information is exchanged between the gNB1 and the gNB2. The exchanged S-5MBSN configuration information may include (but not limit to) S-5MBSN identifier (e.g., the identifier associated with SAI), 5MBS identifier (e.g., MBS Session ID, TMGI, etc.), G-RNTI, source transmitted frequency and period, started 5MBS sequence number, UE context information, UE supported/interest frequency, group UE identifier, UE's mobility restriction, etc. If the gNB2 accepts to join the S-5MBSN, it would start to buffer the 5MBS content for achieving 5MBS QoS (e.g., reliability) requirement and service continuity. The gNB2 may buffer at least the stared sequence of 5MBS content and start to broadcast the 5MBS content for the group of UEs. The gNB2 may start a 5MBS SC timer after the reception of 5MBS SC request from gNB1 and stop the transmission of 5MBS content when the timer is expired. It means that if all of the group UEs do not enter in the coverage of gNB2 and/or there is no other UE(s) interests the 5MBS content in gNB2, the gNB2 should stop the transmission of 5MBS content after the timer is expired. Then the gNB2 responds the 5MBS SC response with the related accepted 5MBS SC handover information (e.g., target transmitted frequency and period). The gNB1 transmits the 5MBS SC handover (HO) command (e.g., with the S-5MBSN configuration information and the target transmitted frequency and period) to the UEs for SC configuration. The 5MBS SC HO command may transmit by the broadcasted system information to inform the group of UEs for performing 5MBS SC group handover. The UE(s) may transmit the 5MBS SC HO complete (e.g., NR Counting message(s)) with SC indication/the end of received 5MBS sequence number to the gNB1/gNB2 (FIG. 10 only shows the message is sent to gNB2). When the UE detects that the UE is leaving or entering the boundary of source or target gNB by some of S-5MBSN information (e.g., S-5MBSN identifier, 5MBS identifier, G-RNTI) belonging to the stored S-5MBSN, the UE can transmit the 5MBS SC HO complete for service continuity. Then the group UEs' path switching is performed by S-5MBSN and 5MBS system. The 5MBS content is transmitted continuously during the 5MBS SC group handover. In some cases, if the 5MBS SC HO complete (e.g., NR Counting for target gNB) with SC indication/the end of received 5MBS sequence number is transmitted to the gNB1. Then the group UEs' path switching is performed by S-5MBSN and 5MBS system. The gNB1 may transmit the 5MBS SC request with SC bit and the transmitted ended sequence number to the gNB2 during UE path switching. The gNB2 may buffer at least the ended sequence number of 5MBS content and start to broadcast the 5MBS content for the group of UEs. The gNB2 may start a 5MBS SC timer after the reception of 5MBS SC request from gNB1 and stop the transmission of 5MBS content when the timer expiry. It means that if all of the group UEs do not enter in the coverage of gNB2 and/or there is no other UE(s) interests the 5MBS content in gNB2, the gNB2 should stop the transmission of 5MBS content after the timer is expired. When the UE detects the boundary of target gNB based on some of received S-5MBSN information (e.g., S-5MBSN identifier, 5MBS identifier, G-RNTI) belonging to the stored S-5MBSN, the UE can transmit the 5MBS SC indication/received end of 5MBS sequence number (e.g., in NR counting, 5MBS InterestIndication, or the other UL feedback) to the gNB2 for 5MBS SC HO. The 5MBS content is transmitted continuously during the 5MBS SC HO. Upon the reception of the 5MBS SC indication from the UE, the gNB2 may stop/restart the 5MBS SC timer for sustaining 5MBS content transmission. In this embodiment, the gNB1 and gNB2 may unicast or broadcast the 5MBS content for the UEs depending on the number of interests UEs. The transmitted 5MBS SC HO command is broadcasted to the UEs. The 5MBS SC HO complete is unicast signaling.

Figure 11:
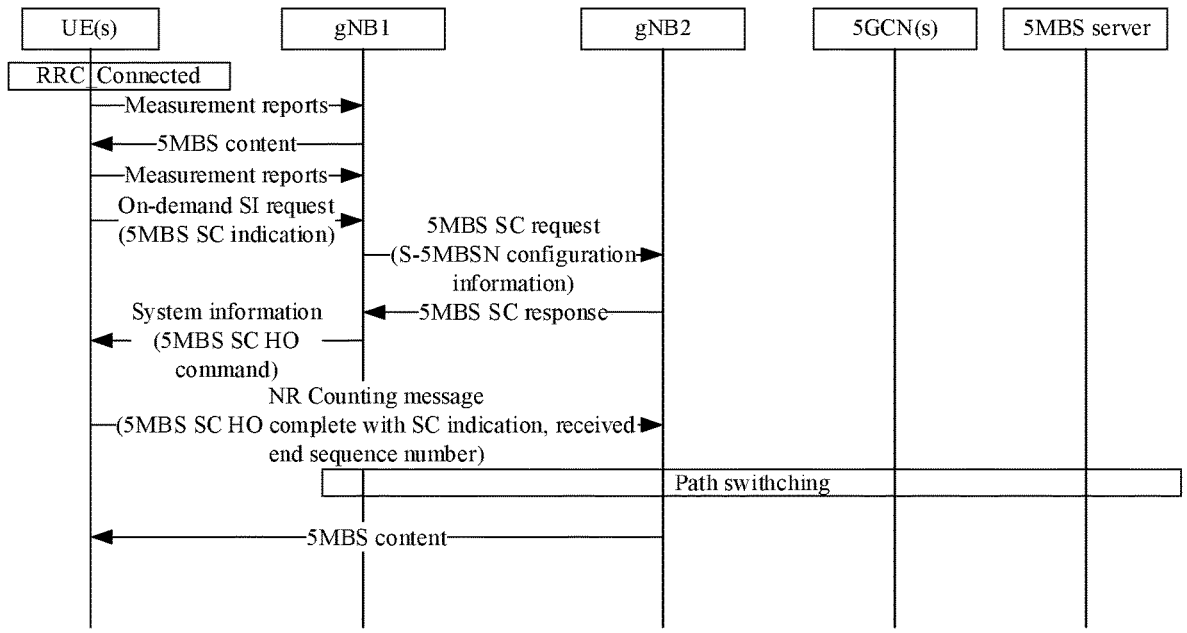
FIG. 11 is a schematic diagram illustrating an architecture of 5 MBS service continuity according to an embodiment of the present disclosure.

FIG. 11 illustrates an architecture of 5MBS service continuity according to an embodiment of the present disclosure. FIG. 11 illustrates that, in some embodiments, the UEs (i.e., at least one UE) are a group of RRC_Connected UEs, the gNB1 is a source gNB, and the gNB2 is a target gNB for 5MBS SC group handover. During 5MBS UEs handover, the same 5MBS content required by a group of UEs may be pre-configured with a group UE identifier. Upon the reception of measurement reports from UEs, when the 5MBS SC UE handover condition is met (e.g., UE closes to the cell boundary of gNB1/the boundary of S-5MBSN, here we take that the UE closes the cell boundary of gNB1 as an example), the UE transmits the 5MBS SC indication (e.g., On-demand system information (SI) request) to the gNB1 for initiating 5MBS SC group handover. Furthermore, if this embodiment is applicable to 5G private networks, the 5MBS SC group handover condition should take the UEs' mobility restriction into account. Based on the information of neighboring cell(s) for the UE/the same 5MBS session provided by the partner(s) (e.g., gNB2), the S-5MBSN configuration information is exchanged between the gNB1 and the gNB2. The gNB1 transmits the 5MBS SC request with the S-5MBSN configuration information to the gNB2. The exchanged S-5MBSN configuration information may include (but not limit to) S-5MBSN identifier (e.g., the identifier associated with SAI), 5MBS identifier (e.g., MBS Session ID, TMGI, etc.), G-RNTI, source transmitted frequency and period, started 5MBS sequence number, UE context information, UE supported/interest frequency, group UE identifier, UE's mobility restriction, etc. If the gNB2 accepts to join the S-5MBSN, it would start to buffer the 5MBS content for achieving 5MBS QoS (e.g., reliability) requirement and service continuity. The gNB2 may buffer at least the stared sequence of 5MBS content and start to broadcast the 5MBS content for the group of UEs. The gNB2 may start a 5MBS SC timer after the reception of 5MBS SC request from gNB1 and stop the transmission of 5MBS content when the timer is expired. It means that if all of the group UEs do not enter in the coverage of gNB2 and/or there is no other UE(s) interests the 5MBS content in gNB2, the gNB2 should stop the transmission of 5MBS content after the timer is expired. Then the gNB2 responds the 5MBS SC response with the related accepted 5MBS SC handover information (e.g., target transmitted frequency and period). The gNB1 transmits the 5MBS SC handover (HO) command (e.g., with the S-5MBSN configuration information and the target transmitted frequency and period) to the UEs for SC configuration. Based on the number of received on-demand SI request, the 5MBS SC HO command may transmit by the unicast or broadcasted system information to inform the group of UEs for performing 5MBS SC group handover. The UE(s) may transmit the 5MBS SC HO complete (e.g., NR Counting message(s)) with SC indication/the end of received 5MBS sequence number to the gNB1/gNB2 (FIG. 11 only shows the message is sent to gNB2). When the UE detects that the UE is leaving or entering the boundary of source or target gNB by some of S-5MBSN information (e.g., S-5MBSN identifier, 5MBS identifier, G-RNTI) belonging to the stored S-5MBSN, the UE can transmit the 5MBS SC HO complete for service continuity. Then the group UEs' path switching is performed by S-5MBSN and 5MBS system. The 5MBS content is transmitted continuously during the 5MBS SC group handover. In some cases, if the 5MBS SC HO complete (e.g., NR Counting for target gNB) with SC indication/the end of received 5MBS sequence number is transmitted to the gNB1. Then the group UEs' path switching is performed by S-5MBSN and 5MBS system. The gNB1 may transmit the 5MBS SC request with SC bit and the transmitted ended sequence number to the gNB2 during UE path switching. The gNB2 may buffer at least the ended sequence number of 5MBS content and start to broadcast the 5MBS content for the group of UEs. The gNB2 may start a 5MBS SC timer after the reception of 5MBS SC request from gNB1 and stop the transmission of 5MBS content when the timer is expired It means that if all of the group UEs do not enter in the coverage of gNB2 and/or there is no other UE(s) interests the 5MBS content in gNB2, the gNB2 should stop the transmission of 5MBS content after the timer is expired. When the UE detects the boundary of target gNB based on some of received S-5MBSN information (e.g., S-5MBSN identifier, 5MBS identifier, G-RNTI) belonging to the stored S-5MBSN, the UE can transmit the 5MBS SC indication/ received end of 5MBS sequence number (e.g., in NR counting, 5MBS InterestIndication, or the other UL feedback) to the gNB2 for 5MBS SC HO. The 5MBS content is transmitted continuously during the 5MBS SC HO. Upon the reception of the 5MBS SC indication from the UE, the gNB2 may stop/restart the 5MBS SC timer for sustaining 5MBS content transmission. In this embodiment, the gNB1 and gNB2 may unicast or broadcast the 5MBS content for the UEs depending on the number of interests UEs. The transmitted 5MBS SC indication (e.g., on-demand SI request) and 5MBS SC HO complete (e.g., NR counting message) is unicast to the gNBs separately. The 5MBS HO command is broadcasted or unicast signaled to the UE(s) depending on the number of interests UEs.

Figure 12:
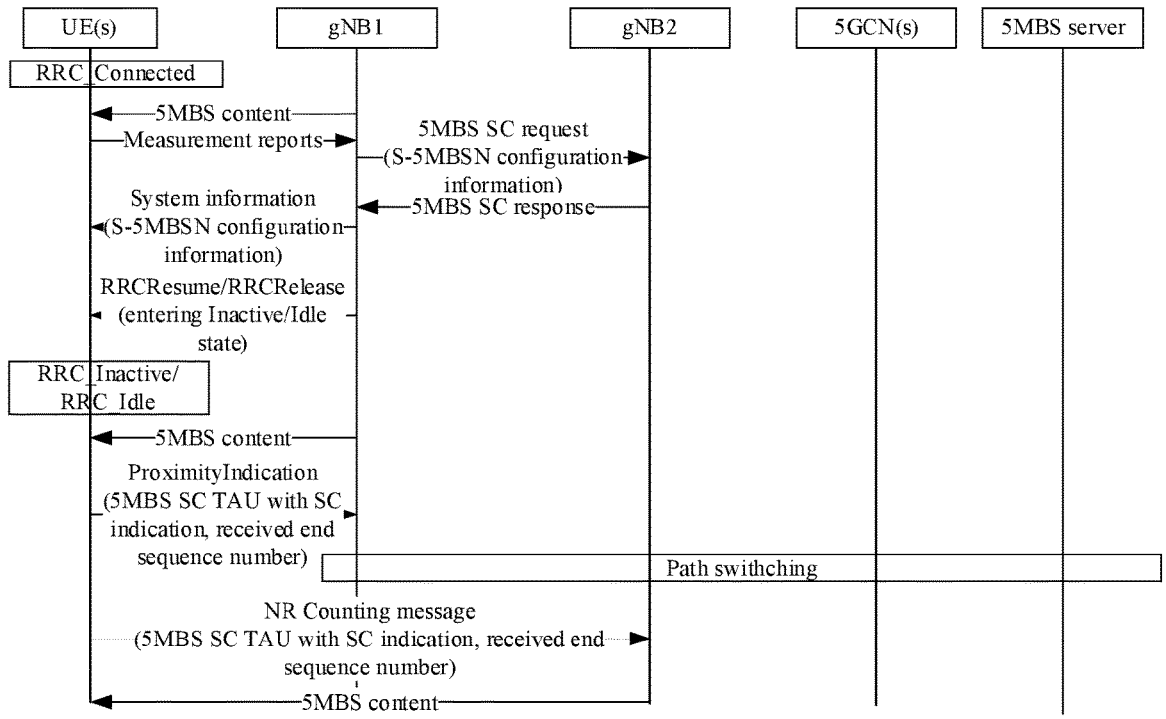
FIG. 12 is a schematic diagram illustrating an architecture of 5MBS service continuity according to an embodiment of the present disclosure.

FIG. 12 illustrates an architecture of 5MBS service continuity according to an embodiment of the present disclosure. FIG. 12 illustrates that, in some embodiments, the UE is an RRC_Inactive/RRC_Idle UE, the gNB1 is a source gNB, and the gNB2 is a target gNB for 5MBS SC tracking area update (TAU). Upon the reception of measurement report from UE, the exchanged S-5MBSN configuration information is performed by the serving gNB (i.e., gNB1). Based on the information of neighboring cell(s) for the UE/the same 5MBS session provided by the partner(s) (e.g., gNB2), the gNB1 transmits the 5MBS SC request with the S-5MBSN configuration information to the gNB2. The exchanged S-5MBSN configuration information may include (but not limit to) S-5MBSN identifier (e.g., the identifier associated with SAI), 5MBS identifier (e.g., MBS Session ID, TMGI, etc.), G-RNTI, source transmitted frequency and period, started 5MBS sequence number, UE context information, UE supported/interest frequency, UE's mobility restriction, CAG ID, etc. If the gNB2 accepts to join the S-5MBSN, it would start to buffer the 5MBS content for achieving 5MBS QoS (e.g., reliability) requirement and service continuity. The gNB2 may start a 5MBS SC timer after the reception of 5MBS SC request from gNB1 and stop the transmission of 5MBS content when the timer is expired. It means that if the UE does not enter in the coverage of gNB2 and/or there is no other UE(s) interests the 5MBS content in gNB2, the gNB2 should stop the transmission of 5MBS content after the timer is expired. Then the gNB2 responds the 5MBS SC response with the related accepted 5MBS SC configuration information (e.g., supported transmitted frequency and period). The gNB1 transmits the system information (e.g., with the S-5MBSN configuration information and the neighboring 5MBS transmitted frequency and period) to the UE for SC configuration. Upon the reception of RRCResume/RRCRelease from the gNB1, the UE enters in RRC_Inactive/RRC_Idle after receiving the S-5MBSN configuration information. The 5MBS content is provided continuously to the UE in RRC_Inactive/RRC_Idle for saving power of UE and network resource. When the 5MBS SC UE TAU condition is met (e.g., UE detects the boundary of gNB1/gNB2/S-5MBSN), the UE transmits the 5MBS SC indication/received end of 5MBS sequence number (e.g., in ProximityIndication) to the gNB1 for 5MBS SC TAU. Furthermore, if this embodiment is applicable to 5G private networks, setting S-5MBSN and the 5MBS SC TAU condition should take the UE's mobility restriction into account. Then the UE path switching is performed by S-5MBSN and 5MBS system. When the UE detects the boundary of target gNB based on some of received S-5MBSN information (e.g., S-5MBSN identifier, 5MBS identifier, G-RNTI) belonging to the stored S-5MBSN, the UE can transmit the 5MBS SC indication/received end of 5MBS sequence number (e.g., in NR counting, 5MBS InterestIndication, on-demand SI request, or the other UL feedback) to the gNB2 for 5MBS SC TAU. The 5MBS content is transmitted continuously during the 5MBS SC TAU. Upon the reception of the 5MBS SC indication from the UE, the gNB2 may stop/restart the 5MBS SC timer for sustaining 5MBS content transmission. In this embodiment, the gNB1 and gNB2 may unicast or broadcast the 5MBS content for the UE. The transmitted 5MBS SC indication is unicast to the gNBs separately. In some case, the UEs (i.e., at least one UE) are a group of RRC_Inactive/RRC_Idle UEs for 5MBS SC group TAU (G-TAU). During 5MBS UEs TAU, the same 5MBS content required by a group of UEs may be pre-configured with a group UE identifier before/ when entering RRC_Inactive/RRC_Idle. The exchanged S-5MBSN configuration information may include (but not limit to) S-5MBSN identifier (e.g., the identifier associated with SAI), 5MBS identifier (e.g., MBS Session ID, TMGI, etc.), G-RNTI, source/candidate transmitted frequency and period, started 5MBS sequence number, UE context information, UE supported/interest frequency, group UE identifier, UEs' mobility restriction, etc. When the 5MBS SC G-TAU condition is met (e.g., at least one UE detects the boundary of gNB1/gNB2/S-5MBSN), the UE(s) transmits the 5MBS SC indication/received end of 5MBS sequence number (e.g., in ProximityIndication) to the gNB1 for 5MBS SC G-TAU. Furthermore, if this embodiment is applicable to 5G private networks, setting S-5MBSN and the 5MBS SC G-TAU condition should take the UEs' mobility restriction into account. The gNB1 transmits the 5MBS SC request with SC bit and the transmitted started sequence number to the gNB2. The gNB2 may buffer at least the start of started sequence number of 5MBS content and start to broadcast the 5MBS content for the group of UEs. The gNB2 may start a 5MBS SC timer after the reception of 5MBS SC request from gNB1 and stop the transmission of 5MBS content when the timer expiry. It means that if all of the group UEs do not enter in the coverage of gNB2 and/or there is no other UE(s) interests the 5MBS content in gNB2, the gNB2 should stop the transmission of 5MBS content after the timer is expired. When at least one of the group UEs detects that it is entering the boundary of target gNB based on some of received S-5MBSN information (e.g., S-5MBSN identifier, 5MBS identifier, G-RNTI) belonging to the stored S-5MBSN, the UE(s) can transmit the 5MBS SC indication/received end of 5MBS sequence number (e.g., in NR counting, 5MBS InterestIndication, on-demand SI request, or the other UL feedback) to the gNB2 for 5MBS SC G-TAU. The 5MBS content is transmitted continuously during the 5MBS SC G-TAU. Upon the reception of the 5MBS SC indication from at least one of the group UE, the gNB2 may stop/restart the 5MBS SC timer for sustaining 5MBS content transmission.

For dual active protocol stack (DPAS) handover and/or dual connectivity (DC) scenario, either PTM bearer or PTP bearer is transmitted in master node (MN) and secondary node (SN) simultaneously depends on QoS requirement, DL loading, number of interests UE, etc. For example, when the MN is a macro cell and the SN is a small cell, the 5MBS content may be transmitted by PTP bearer of MN or PTM bearer of SN. The transmitted bearer type can be exchanged between MN and SN for high reliability and service continuity consideration. In some cases, when the 5MBS SC leg modification command is transmitted by System information to inform the UE for performing 5MBS SC leg modification, the UE can transmit the 5MBS SC indication/received end of 5MBS sequence number (e.g., in NR counting, 5MBS InterestIndication, or the other UL feedback) to the gNB3 for 5MBS SC leg modification. The 5MBS content is transmitted continuously during the 5MBS SC leg modification. Upon the reception of the 5MBS SC indication from the UE, the gNB3 may stop/restart the 5MBS SC timer for sustaining 5MBS content transmission. Note that the dual connectivity (i.e., MN and SN) can be extend to multiple connectivity (i.e., MCG and SCG) when the 5MBS content is configured to the extremely reliability requirements. In other cases, if a UE is configured with an MCG and a SCG using NR radio access in FR1 and/or in FR2, the UE is configured a S-5MBSN for 5MBS reception with MCG and/or SCG. Upon receiving 5MBS SC HO/TAU command message, the path switch for the UE is established. And the source gNB1 may stop 5MBS content transmission upon receiving UE context release from the target gNB2. In this embodiment, the gNB1, gNB2, and gNB3 may unicast or broadcast the 5MBS content for the UE. The transmitted 5MBS SC SN change command, 5MBS SC leg modification command, 5MBS SC SN change complete, 5MBS SC leg modification complete is unicast signaling.

In addition, the gNB1, the gNB2, and the gNB3 may adopt the RAN functional split. The related gNB-CU/gNB-DU UE F1AP identifier and parameters in the 5MBS transmission may be used. The same 5MBS frequency can be adopted between the inter-cell within the same gNB-DU/gNB-CU for 5MBS transmission. A procedure related to the 5MBS HO/5MBS TAU/5MBS DPAS or DC transmission/5MBS bearer switching is performed as the aforesaid embodiments, wherein the RRC message proposed in the above embodiments is encapsulated in the F1AP message(s) (e.g., UE Context Modification, DL/UL RRC Message Transfer, etc.) and will not be described again.

Commercial interests for some embodiments are as follows. 1. Solving issues in the prior art. 2. Providing a lower power consumption for 5MBS reception. 3. Providing a better resource efficiency for 5MBS networks. 4. Providing a higher reliability of 5MBS transmission. 5. Reducing a data loss during handover. 6. Providing a service continuity due to mobility. 7. Providing a good communication performance. 8. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR licensed and non-licensed or shared spectrum communications. Some embodiments of the present disclosure propose technical mechanisms.

Figure 13:
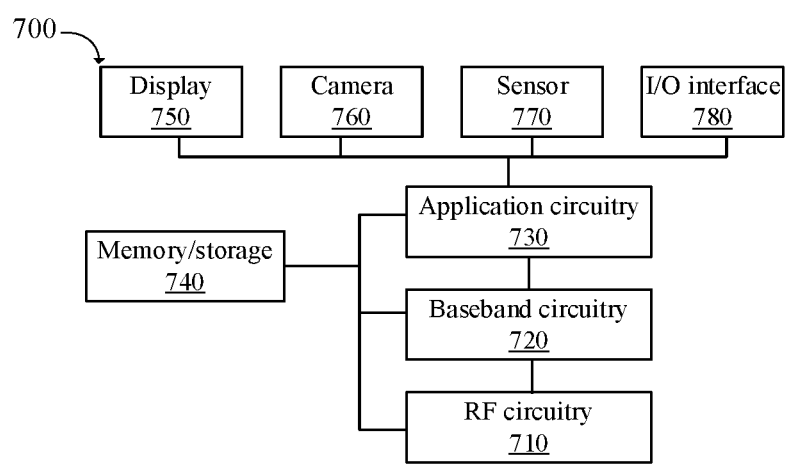
FIG. 13 is a block diagram of a system for wireless communication according to an embodiment of the present disclosure.

FIG. 13 is a block diagram of an example system 700 for wireless communication according to an embodiment of the present disclosure. Embodiments described herein may be implemented into the system using any suitably configured hardware and/or software. FIG. 13 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method for multicast and broadcast service (MBS) by a user equipment (UE), comprising:
 transmitting a UE assistance information to a source cell and/or a target cell for cell reselection;
 receiving a group notification from the source cell and/or the target cell, wherein the group notification is transmitted based on a 5G multicast and broadcast service (5MBS) service continuity (SC) request and a 5MBS response between the source cell and the target cell; and receiving an MBS data transmission via a specific bearer type from the source cell and/or the target cell based on an MBS quality of service (QoS) requirement, wherein the MBS data transmission is transmitted via a multicast radio bearer (MRB) which is multiplexed with a unicast data.

2. The method of claim 1, wherein the group notification is a new system information block (SIB), an RRC reconfiguration, or a paging.

3. The method of claim 1, wherein the UE assistance information comprises a measurement report, when the UE transmits the measurement report to the source cell and/or the target cell and when a 5MBS SC UE handover condition is met, at least one of the followings is met:

wherein the source cell transmits the 5MBS SC request with a shared-5MBS network (S-5MBSN) configuration information to the target cell;

wherein the UE transmits a 5MBS SC indication to the source cell for initiating the 5MBS SC UE handover; or wherein an exchanged S-5MBSN configuration information is performed by the source cell.

4. The method of claim 3, wherein the 5MBS SC indication comprises some an interested 5MBS frequency, a priority of reception frequency, a received end of 5MBS sequence number, a preferred bearer type, and/or a preferred target gNB.

5. The method of claim 3, wherein the S-5MBSN configuration information comprises at least one of the followings:

a S-5MBSN identifier, a 5MBS identifier, a group radio network temporary identifier (G-RNTI), a bearer type comprising a point-to-multipoint (PTM) bearer or a point-to-point (PTP) bearer for 5MBS, a transmission frequency and period, a sequence number comprising a start sequence number and/or an end sequence number, a 5MBS service continuity bit, a UE context information, a UE capability, a group UE identifier, a mobility restriction of the UE for 5G private network, a closed access group identifier (CAG ID) for 5G private network, or a UE-specific information.

6. The method of claim 5, wherein the MBS data transmission comprises a 5MBS content, and if the target cell accepts to join the S-5MBSN, the target cell starts to buffer the 5MBS content for 5MBS reliability requirement and service continuity.

7. The method of claim 6, wherein the target cell buffers at least an end of a 5MBS sequence number of the 5MBS content and starts to broadcast the 5MBS content for the UE.

8. The method of claim 7, wherein if the UE does not enter in a coverage of the target cell and/or there are no other UE interests in the 5MBS content in the target cell, the target cell stops the transmission of the 5MBS content after the 5MBS SC timer is expired.

9. The method of claim 3, wherein the group notification comprises the S-5MBSN configuration information and the target transmitted frequency and period.

10. The method of claim 9, wherein the 5MBS SC HO complete with the SC indication and/or the end of the received 5MBS sequence number is transmitted in a new radio (NR) counting, interest, or another uplink (UL) feedback.

11. The method of claim 1, wherein the source cell and the target cell unicast or broadcast the 5MBS content for the group of UEs depending on a number of interests UEs in the group of UEs, and/or a 5MBS handover is performed by the group of UEs via a PTP or PTM radio bearer.

12. The method of claim 1, wherein upon a reception of RRC resume/RRC release from the source cell, the UE enters in an RRC inactive state or an RRC idle state after receiving the S-5MBSN configuration information.

13. The method of claim 1, wherein during 5MBS UEs TAU, the group of UEs requiring the same 5MBS content is pre-configured with a group UE identifier before/when entering an RRC inactive/RRC idle state, and/or the 5MBS SC TAU is performed by the group of UEs via a PTP or PTM radio bearer.

14. The method of claim 13, wherein the 5MBS SC indication and/or the end of 5MBS sequence number is transmitted in a new radio (NR) counting, interest, on-demand system information (SI) request, or an uplink feedback.

15. The method of claim 13, wherein in a dual connectivity (DC) procedure, a packet data convergence protocol (PDCP) duplication is activated, a master node (MN) leg activation is performed by the source base station, a secondary node (SN) leg activation is performed by the target base station, and a 5MBS SC indication is transmitted to the source base station by the UE for initiating a 5MBS SC SN change.

16. The method of claim 15, wherein both PTM bearer and PTP bearer can be transmitted simultaneously in the MN and/or the SN depends on a quality of service (QoS) requirement, a downlink loading, a number of interest UEs.

17. The method of claim 16, wherein upon a reception of the 5MBS SC HO complete with the SC indication and/or the end of the received 5MBS sequence number from the UE, a 5MBS SC timer for sustaining a 5MBS content transmission is stopped/restarted by the target cell.

18. A wireless communication method for multicast and broadcast service (MBS) by a cell, comprising:

receiving a user equipment (UE) assistance information for cell reselection from a UE, wherein the cell is a source cell or a target cell;

transmitting a group notification to the UE, wherein the group notification is transmitted based on a 5G multicast and broadcast service (5MBS) service continuity (SC) request and a 5MBS response between the source cell and the target cell; and transmitting an MBS data transmission via a specific bearer type to the UE based on an MBS quality of service (QoS) requirement, wherein the MBS data transmission is transmitted via a multicast radio bearer (MRB) which is multiplexed with a unicast data.

19. A user equipment (UE), comprising:

a memory;

a transceiver; and a processor coupled to the memory and the transceiver;

wherein the processor is configured to perform the method of claim 1.

20. A cell, comprising:

a memory;

a transceiver; and a processor coupled to the memory and the transceiver;

wherein the processor is configured to perform the method of claim 18.

* * * * *